United States Patent Office 3,717,435
Patented Feb. 20, 1973

3,717,435

PROCESS AND APPARATUS FOR MEASURING AND CONTROLLING THE CONCENTRATION OF CHEMICAL COMPOUNDS IN SOLUTIONS

Stefan Ertl, Wallisellen, and Friedrich Oehme, Bassersdorf, Switzerland, assignors to Zellweger, Ltd., Uster, Switzerland Filed Mar. 19, 1970, Ser. No. 21,029
Claims priority, application Switzerland, Sept. 30, 1969, 14,704/69
Int. Cl. G01f *1/06;* G01n *31/16*
U.S. Cl. 23—230 R 17 Claims

ABSTRACT OF THE DISCLOSURE

The present disclosure is directed to a process and apparatus for measuring and regulating the concentration of chemical compounds in solution which comprises transferring a quantity of the solution to be analyzed to a titration vessel, controlling the amount of said solution introduced into the titration vessel, simultaneously transferring a predetermined quantity of an inert liquid diluent with said solution into said titration vessel, introducing at least one titrating agent into the solution in the titration vessel, with at least one metering pump having a specific pump volume per revolution until at least one end point is reached, said end point being monitored by at least one detector element and preselected by means of at least one limit-value contact on an indicating instrument and determining the consumption of the titrating agent by measuring the number of revolutions completed by the metering pump, expressed digitally.

BACKGROUND OF THE INVENTION

The present invention relates to a process and apparatus for measuring and controlling the concentration of chemical compounds in solutions.

In chemical engineering and related fields, it is often necessary to measure the concentration of certain chemi cal compounds in solutions. A typical example of this is measuring the concentration of electroplating baths and also baths for the surface treatment of metals. In the textile industry, too, it is frequently necessary to measure the concentration of baths, for example, desizing baths, bleaching baths or mercerization baths. Even in the very field of chemical engineering, it is repeatedly necessary to measure concentrations, for example, during the preparation of intermediate products for the production of dyes, and the like.

If one of the concentration measurements referred to above were to be carried out and if a preferably electric or even pneumatic signal were available to establish a clear relationship to the concentration of the compound in question in a chemical solution, there would be no difficulty at all in meeting the further requirement of comparing this signal with a selectable nominal value and providing for an automatic correction of concentration. This correction can be provided by means commonly used in control engineering in the event of differences between the nominal value selected and the true value measured.

There are several different types of automatic analyzers for measuring the concentration prior to regulation. Many of these machines are in the form of titrators which provide a sample taken from the bath to be monitored with a suitable titrating agent. A primary detector element which dips into the mixture indicates whether titration has been carried through to the required end point. One well known example is the titration of acids or alkalis in a bath to be monitored with alkalis or acids as titrating agents using a glass electrode measuring system for assessing the condition of the titrated system.

The type of device selected to measure the sample taken from the bath to be monitored and the addition of titrating agent to be measured, is of particular importance. For example, plunger-type burettes or pipettes provided with electrical contacts are used for this purpose, especially when the result of analysis is taken at intervals rather than continuously, which is permissible in the case of solutions undergoing a slow change in concentration. However, if sudden changes in concentration are likely, continuous-cycle automatic analyzers are employed.

This affects the type of measures to be selected for measuring the sample and titration agent to the extent that now continuous constant-output pumps are preferably used at the sample end while variable-output but nevertheless continuous pumps are required for the titrating agent. A variable pump such as this can be obtained for example by adjusting the stroke of the plunger or by changing the rotational speed on the pump motor.

In many cases, it is preferred to measure, at intervals, the concentration of solutions distinguished by the fact that the compound in question is present in high concentration, for example in concentration of a few hundred grams per liter. At such a high concentration as this, the basically known technique of titration can only be applied in cases where the sample is diluted before the titrating agent is added thereto. In conventional methods, such dilution is carried out for example by adding water with a contact pipette or a plunger-type burette. Unfortunately, the disadvantage of this procedure is that appliances such as those require a series of electrical measures which control the addition of the water used for dilution. In addition, it would seem desirable digitally to indicate or even express the result of titration, in which case the digital technique also co-operates with the further stage of data-processing. A digitally indicated or expressed result has the further advantage that reading errors are largely eliminated.

Another desirable measure is to adjust the indication of concentration in such a way that, for example, it is not the milliliters of titrating agent consumed before the end of titration that are indicated, but instead, in a direct manner, concentration units such as grams per liter of the compound in question in the bath to be monitored.

Another requirement is that the automatic analyzer should provide that several different substances can be successively detected in the same bath in a sequence that can be programmed as a function of time.

SUMMARY OF THE INVENTION

An object of the present invention is to provide an improved process and apparatus for measuring and regulating the concentration of chemical compounds in solutions.

Another object of the present invention is to provide an improved process and apparatus for measuring and regulating the concentration of several chemical constituents in one bath utilizing the titration technique.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-identified disadvantages may be eliminated and a much improved process and apparatus for measuring and controlling the concentration of chemical compounds in solutions can be provided wherein a certain quantity of the solution to be analyzed is removed under suction by means of an injector and together with the liquid operating the injector is transferred to a titration vessel. The quantity of diluent liquid which continues to be added on completion of removal under suction is limited in the titration vessel by level switches, after which, a titrating agent is added to the sample present in the titration vessel by means of a pump, known per se, with a certain pump volume per revolution, and is titrated to an end value monitored by means of a primary detector element and preselected by means of at least one limit-value contact on an indicating instrument, the consumption of titrating agent being determined from the number of revolutions completed by the aforementioned pump and expressed and/or indicated digitally.

The invention also relates to an apparatus for carrying out this process, comprising an injector for removing a predetermined quantity of solution under suction from the supply vessel and transferring it together with the liquid operating the injector to a titration vessel provided with level switches for interrupting the injector after a predetermined level has been reached, a pump with a specific pump volume per revolution and an indicator for counting the number of revolutions for delivering titrating agent, and at least one primary detector element which dips into the liquid present in the titration vessel and which cooperates with an indicating instrument comprising at least one limit-value contact.

BRIEF DESCRIPTION OF THE DRAWINGS

The automatic analyzer of which the present invention is based meets all the requirements set out in the foregoing. Its mode of operation and its properties are discussed in detail in the following description with reference to the accompanying drawings, wherein.

DESCRIPTION OF THE PREFERRED EMBODIMENTS

Figure 1:
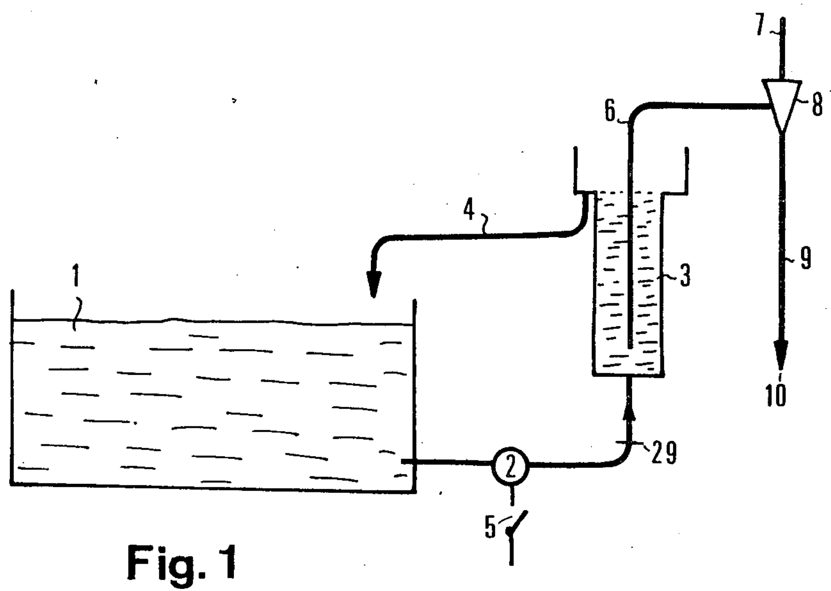
FIG. 1 diagrammatically illustrates the means for removing the solution from the bath to be analyzed.
Figure 2:
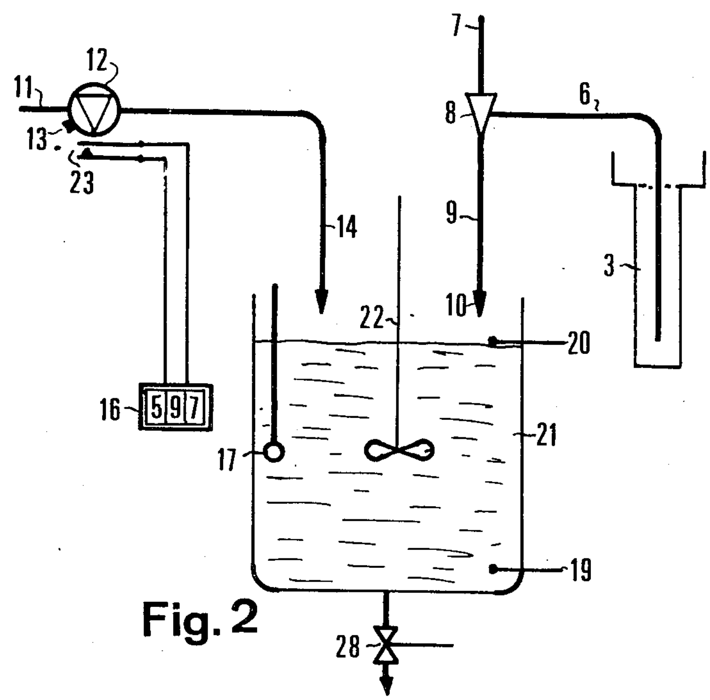
FIG. 2 shows the apparatus necessary for titrating the dilute solution.

Referring now to the drawings, the novel principle for simultaneously removing and diluting a sample to be analyzed will be described with reference to FIG. 1. A pump 2 which can be switched on and off through a timer 5 continuously removes a sample stream from the bath 1 to be monitored for a selectable period, and delivers it to a supply vessel 3 provided with an overflow 4. By virtue of the overflow 4, the liquid settles at a certain specific level in the supply vessel 3. After a certain selectable period, the pump 2 is switched off while at the same time a water-jet injector 8 is switched on through a magnetic valve (not shown in detail) provided in the pressure water-line 7. By means of the injector 8, the bath sample present in the supply vessel 3 is removed under suction from said vessel through the suction pipe 6. The amount of liquid removed from the supply vessel 3, i.e. the sample from bath 1, is governed solely by the submerged length of the suction pipe 6 for given dimensions of the vessel 3 providing the injector 8 is allowed a sufficiently long suction period. The bath sample 10 mixed and diluted with water from the injector passes through the outlet pipe 9 of the injector 8 into a titration vessel 21 (FIG. 2). This titration vessel has two level switches 19 and 20 which restrict the quantity of injector water issuing from the outlet pipe 9. The time allowed for removal of the sample under suction from the supply vessel 3 through the suction pipe 6 is measured in such a way that it amounts to about one-third and at the most about one-half of the time required to fill the titration vessel 21 until the upper level switch 20 is reached.

The quantity of injector water which continues to flow into the titration vessel 21 after the sample has been removed under suction from the supply vessel 3 does not have any effect upon the sample initially introduced. It merely determines the extent to which the bath sample is diluted. Accordingly, volumetric accuracy does not have to meet any stringent requirements herein.

After the level switch 20 has been reached, the injector 8 is switched off and the stirrer 22 switched on. A metering pump 12 delivering the titrating agent 11 then comes into operation. This pump may be in the form of a conventional valveless pump with a rotating plunger which has a milled section successively releasing the suction duct and ejection duct with each revolution. A revolution counter is arranged on the rotary drive section. According to the present invention, this consists of a cemented on, permanent magnet 13 which during each revolution passes close to an inert gas contact 23 and thereby delivers one pulse per revolution to a pulse counter 16. Accordingly, the counter 16 counts the number of revolutions completed by the metering pump 12 and hence provides a measure for the amount of reagent required which is delivered through the pipe 14 to the titration vessel 21 and reacted with the sample initially introduced thereto.

Figure 3:
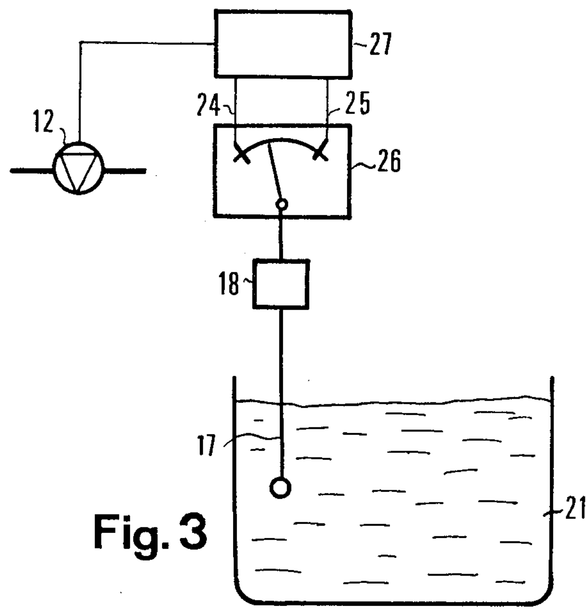
FIG. 3 shows the apparatus required to complete titration.

A detector 17 dipping into the titration vessel 21 which may be in the form of, for example, a pH or redox measuring chain or in the form of a measuring chain consisting of ion-sensitive electrodes or in the form of a measuring chain responding to the progress of titration by other conventional electrochemical methods, enables the progress of titration to be followed by virtue of the fact that as shown in FIG. 3, it is coupled to an amplifier 18 and an indicating instrument 26 equipped with adjustable limit-value contacts 24, 25. One of the two contacts, 25, is adjusted to the required end point of titration expressed as a voltage or a current. By contrast, the second contact 24 defines a range which precedes the required end value of titration. As titration nears its end point, recognizable from a change in the reading of the instrument 26, the metering pump 12 is only operated periodically through a pulse generator 27. Accordingly, as titration approaches its selected end point, the titrating agent is added at a slower rate so as to avoid over-titration. This technique of dividing meter 26 into three sections, the first being to the left of contact 24 wherein pump motor 12 is fully energized, the second being between contacts 24 and 25 wherein pump motor 12 is intermittently operated and the third to the right of contact 25 wherein no energization of pump motor 12 occurs, is known as three-zone regulation.

The principles of three-zone regulation, known per se, described in the foregoing may also be replaced by other known measures for slowing the rate of titration and titration approaches its completion. Basically, they are not the subject of this invention.

When an indicator position corresponding to the selected end point contact 25 is ultimately reached during titration, the metering pump 12 is completely switched off. However, facilities can be provided, in the form of a time relay known per se (not shown), to ensure that, in the event of continued reaction between sample and titration agent in the titration vessel 21, the metering pump can be repeatedly started up until finally a stable state is reached. Accordingly, a delay period preceding the final completion of titration can be predetermined with this time relay, which is of advantage in the case of slowly reacting systems and which is favorably reflected in the level of analytical accuracy achieved.

By correctly adjusting the titer of the titrating agent 11 delivered by the metering pump 12, it is possible, in the case of a pump of specific output, for the pulse counter 16 directly to indicate the concentration of the titrated compound of the bath in concentration units, for example, in grams per liter.

The following process represents another means of obtaining a direct indication of concentration:

The titer of the titration agent is initially only roughly established, for example accurate to ±25%. Following the titration of a calibrated sample, the output of the metering pump 12 delivering the titrating agent is adapted to the titer determined. Metering pumps provided with means for manually adjusting output are used for this purpose. Accordingly, it is also possible to derive from the reading of the counter 16 the quantity of titrating agent which has to be added for a certain quantity of sample before titration is at an end. Appropriate conversion factors may then be used to determine the concentration of the titrated component of bath 1 in required concentration units, for example, in grams per liter.

Metering pumps known per se with an adjustable-plunger may be used with advantage for this purpose. In this case, a manually adjustable inclination of the plunger, relative to a spatially fixed rotating control disc, enables the output to be varied.

According to the present invention, the requirement frequently encountered of detecting several constituents in one bath by the technique of titration described above, can be satisfied by using a titrating agent which is able to enter successively into different chemical reactions with the sample introduced into the titration vessel, beforehand, in the course of titration. One such example is illustrated in FIG. 4 for the titration of sulfuric acid and copper in an acid copper bath.

Figure 4:
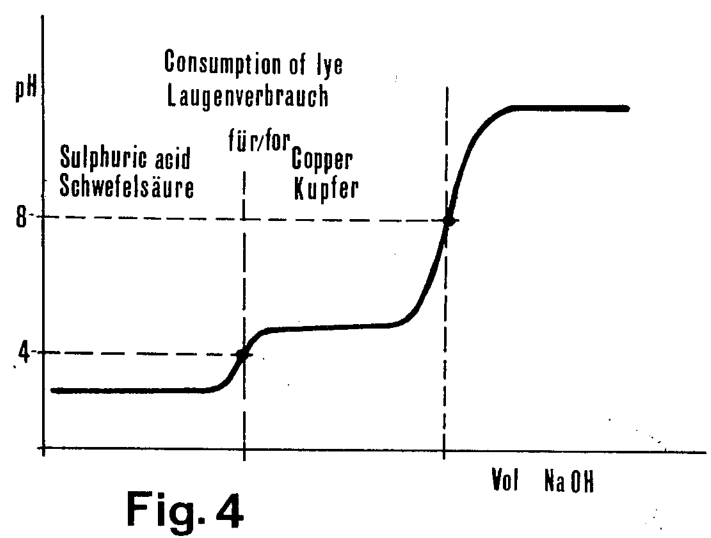
FIG. 4 is a graph illustrating a two-stage titration process.
Figure 5:
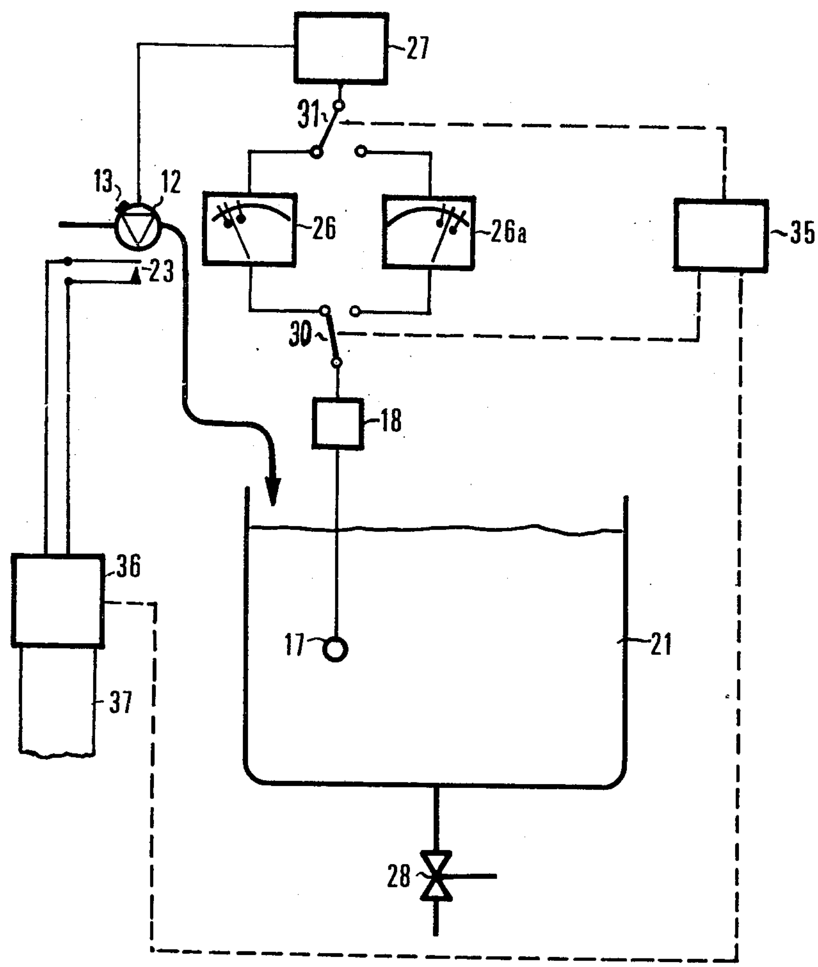
FIG. 5 shows the apparatus required for a two-stage titration process.

It can be seen that, in the titration of the bath with a sodium hydroxide solution, a first turning point indicating neutralization of the sulfuric acid is reached. During the continued addition of alkali, a second turning point is reached corresponding to precipitation of the copper in the form of basic copper sulfate-$CuSO_4$ $Cu(OH)_3$. According to the present invention, the separate detection of sulfuric acid and copper in a sulfuric acid copper bath can be carried out by the following procedure using the apparatus described in the foregoing, amplified to some extent:

The indicating instrument 26 whose adjustable contacts for the titration of sulfuric acid are adjusted, for example, to the pH-values 3.5 and 4, is situated at the output of the amplifier 18 (FIG. 5). After the sample has been prepared in the titration vessel 21, the pump 12 comes into operation by means of a timer, known per se (not shown), and titrates the sulfuric acid in accordance with the principles of three-zone regulation. When ultimately a pH-value of 4 is reached (FIG. 4), the pump 12 is switched off and a pulse printer 36 connected in place of the pulse counter 16 in FIG. 2 prints the consumption of alkali onto the recording paper 37. The timer then switches on a control unit 35 operated by relays which sets the counting mechanism of the printer to zero and couples the indicating instrument 26*a*, whose contacts are adjusted to the pH-values 7.5 and 8 for the titration of copper as shown in FIG. 4, to the output of the amplifier 18. At the same time, the pulse generator 27 of the three-zone regulating system is connected to these contacts. The timer then switches the pump 12 on again and sodium hydroxide solution is added to the sample in the titration vessel 21 until titration comes to an end at a pH of 8, after which the pump 12 is switched off and the printer 36 again begins printing the consumption of alkali. The timer then returns the counting mechanism of the printer to zero through the control unit 35, reconnects the instrument 26 to the output of the amplifier 18 and the pulse generator 27 and opens a valve 28 in the outlet of the titration vessel 21. All further switching functions which are not shown in any detail are carried out in such a way that the automatic titration system is available for a fresh analysis. The timer controlling the apparatus as a whole may be designed, for example, in such a way that a fresh analysis is only carried out after a selectable delay period. In this connection, measures may also be taken to ensure that another sulfuric acid copper bath is analyzed in this delay period. The usually inevitable spatial distance to the second bath can be bridged with a liquid circuit which delivers the bath solution by means normally used to carry liquids such as pumps and valves to the input 29 in FIG. 1 of the automatic titration system.

In addition to the titration of sulfuric acid and copper with sodium hydroxide solution described in the foregoing, this process of separately titrating two components of one bath can also be applied to any other chemical systems which are distinguished by the appearance of separate turning points in the form of a graph as shown in FIG. 4. This applies, for example, to the titration of cations with complex ions which are distinguished by vastly different stability constants for the individual cations present in the sample.

Figure 6:
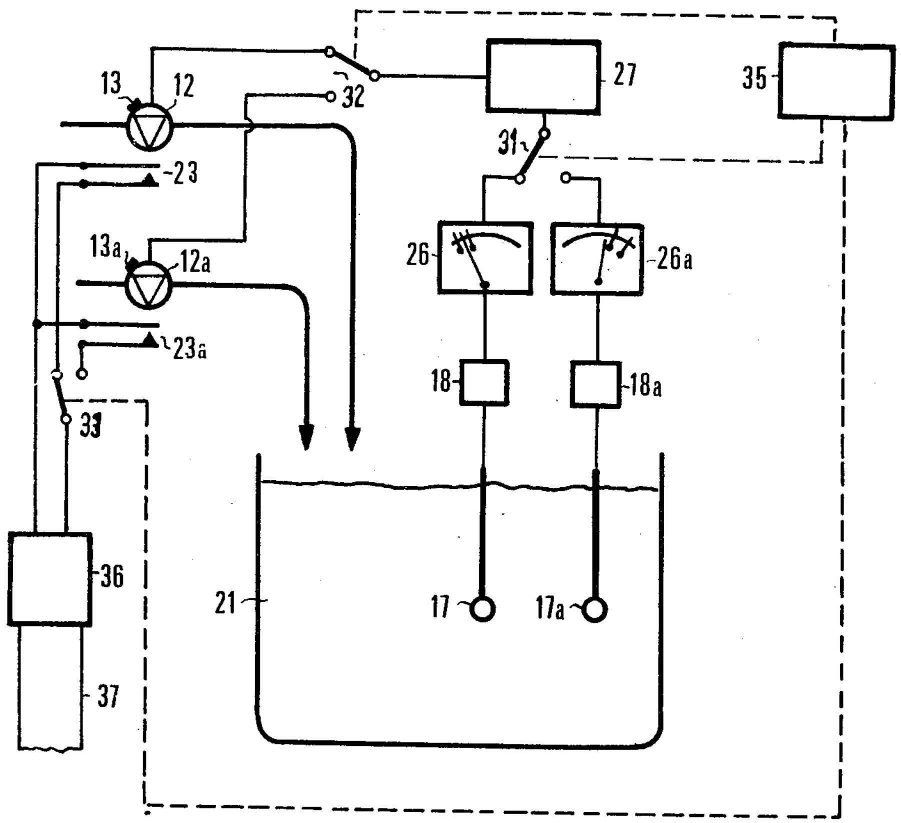
FIG. 6 shows one possible modification of the apparatus for carrying out a titration process completed in stages.

However, numerous instances wherein the double use of one titrating agent is not possible, are also frequently encountered in practice. The detection of nickel and boric acid in a nickel plating bath is mentioned as an example. In cases such as these, the following procedure is adopted in accordance with the present invention:

A solution of Komplexon III and sodium hydroxide is used as the titrating agents for the two compounds nickel and boric acid. Since boric acid, being a very weak acid, cannot be directly titrated with sodium hydroxide, use is made of the known effect of strengthening the acid character of boric acid by complex formation with certain polyalcohols, for example, sorbitol, and the like. There is no need here to go into the details of this complex formation of boric acid. It is merely emphasized that the addition of boric acid into the titration vessel 21 containing the sample to be titrated can be carried out by the measures already described and illustrated in FIG. 1. In this case, an auxiliary solution in the form of a sorbitol solution would thus be dispensed by means of another constant-level overflow vessel and another suction pipe connected to the injector 8. As shown in FIG. 6, two metering pumps 12 and 12*a* are now available for the two titrating agents Komplexon III and sodium hydroxide. A copper-sensitive solid electrode 17, effective for indicating the complexometric titrations, is used as the detector for following the titration of nickel with Komplexon III. The titration of the boric acid-sorbitol complex with sodium hydroxide is indicated through a second detector 17*a* consisting of a glass electrode measuring chain. Two amplifiers 18 and 18*a* and two indicating instruments 26 and 26*a*, whose contacts as shown in FIG. 4 are adjusted responsive to the sudden changes in the value of the two detectors measured in millivolts or in pH units occurring during these titrations, are available for both the detectors 17 and 17*a*. Depending upon the method of titration, these contacts are alternatively connected to a common pulse generator 27 used for three-zone regulation, in which case a timer delivers the switching commands to the control unit 35. Depending upon the type of titrating agent to be added, the control section 35 switches the counting impulses coming from the reed relays 23 and 23*a* to the printer 36. A decision would have to be made depending upon the properties of the chemical compounds to be detected in one bath, as to whether the two titrations can be successively carried out in the same sample in the titration vessel 21 or whether the titration vessel 21 should be emptied in accordance with a time program and filled with fresh sample. This process which is characterized by the use of two different titrating agents also affords the possibility of directly expressing the digitally expressed measured value in required concentration units through the measures described in the foregoing.

The introduction of an auxiliary solution already described in connection with the detection of boric acid may also be necessary in the case of other titrating agents. Thus, it is necessary in the case of all complexometric titrations to adjust the sample in the titration vessel 21 to specific pH-values because only then will complex formation follow a specific course. The introduction of these auxiliary solutions is another subject of the invention, the auxiliary being taken from an appropriate supply of auxiliary solution through additional suction pipes connected to the injector 8. In cases such as these the required metering accuracy is not very high because all that is important is that there should be an adequate access of auxiliary solution available. Accordingly, there may occasionally be no need to remove the auxiliary solution under suction from a constant-level overflow vessel, thus simplifying the apparatus.

The measures described in the foregoing for measuring concentration by titration with the result of analysis being digitally indicated, thus provide the conditions for the subsequent automatic regulation of concentration. The result of titration represents the true value of the concentration of the compound in question. However, the digital result initially has to be converted back into an analogue result in order to be able to be compared with the nominal value of the concentration delivered similarly as an analogue value into a regulator, and to provide for suitable measures which effect the necessary correction of concentration according to the deviation, that is to say, the difference between the nominal value and the true value.

The requisite digital-analogue conversion is carried out by methods known per se. One example is to use a stepping motor which is driven by the impulses emanating from the relay 23 and which adjusts a potentiometer included in a voltage divider circuit by way of a reduction gear. The voltage tapped from the sliding contact of the potentiometer is an analogue measure of the concentration of the titrated compound in the sample and may thus be compared with the analogue nominal value. In this case, the voltage difference formed is a direct measure of the existing deviation. This differential voltage can be fed to a power amplifier and used to actuate regulating elements, for example, in the form of conventional motor-driven valves which, depending upon the sign of the differential voltage, open or close and in this way vary, for example, the delivery of a supply solution of the compounds to be regulated in the baths until the deviation is zero. This procedure is not affected by the fact that the analogue true-value signal is only available for a limited period of time. It is only those corrections that are carried out with a tendency to allow the deviation to disappear that are carried out at intervals.

Another possibility of digital-analogue conversion is to use integrating operation amplifiers. One conventional amplifier of this kind supplies an analogue output signal which represents the time integral of the impulses from the inert gas relay 23. This output signal represents the analogue true-value which, as already described, can be further processed by control techniques.

In both the cases described, precautions must be taken by known method to ensure that after the analogue true-value has been interrogated it is cancelled again so that the digital-analogue converter is available again for fresh measurements.

The invention being thus described, it will be obvious that the same may be varied in many ways. Such variations are not be be regarded as a departure from the spirit and scope of the invention, and all such modifications as would be apparent to one skilled in the art are intended to be included.

What is claimed is:

1. A process for measuring the concentration of at least one chemical compound in solution which comprises transferring a fixed batch quantity of the solution to be analyzed to a titration vessel, simultaneously transferring a predetermined quantity of an inert liquid diluent with such solution into said titration vessel, introducing at least one titrating agent into the solution in the tritration vessel with at least one metering pump having a specific pump volume per revolution, monitoring the introduction of said titrating agent to determine at least one end point resulting from titration reaction of the titrating agent and at least one compound in said solution, periodically stopping the metering pump to reduce the rate of introduction of said at least one titrating agent just before said at least one end point is reached, stopping said metering pump to terminate the introduction of said at least one titrating agent upon reaching said at least one end point and determining the amount of titrating agent introduced to reach said at least one end point by measuring the number of revolutions completed by said metering pump.

2. The process of claim 1, wherein the solution to be analyzed is transferred under suction by means of an injector together with the diluent liquid which operates said injector, to the titration vessel.

3. The process of claim 1, wherein the solution to be analyzed is first transfered to a supply vessel before being transferred to the titrating vessel, the fixed batch quantity of said solution to be analyzed being determined by the dimensions of the supply vessel and the extent to which a suction pipe, which communicates with the injector, extends into said vessel.

4. An apparatus for measuring the concentration of at least one chemical compound in solution which comprises a titration vessel, means for introducing a fixed batch quantity of the solution to be measured to said titration vessel with a predetermined quantity of an inert liquid diluent, at least one pump means with a specific pump volume per revolution provided for introducing a titrating agent to the titration vessel, at least one detector means for detecting at least one end point resulting from the introduction of said titrating gent which extends into the titration vessel, at least one indicating instrument provided with adjustable limit-value contacts which is operatively associated with said detector means and is adapted to stop said pump means periodically to reduce the rate of introduction of said titrating agent just before said at least one end point is reached and to stop said pump means upon the detection of said at least one end point, and indicator means associated with said pump means for counting the number of revolutions required for delivering the titrating agent to reach said at least one end point.

5. The apparatus of claim 4, wherein the means for introducing the solution to be measured to said titration vessel comprises, in combination, at least one container means for storing said solution, a supply vessel communicating with said container means, means for continuously supplying said solution to said supply vessel, an injector means for drawing the solution from the supply vessel and for introducing it into the titration vessel with said inert liquid diluent and means for periodically stopping the supply of said solution to said supply vessel during operation of said injector means.

6. The apparatus of claim 5, wherein conduit means provides communication between said container means and the supply vessel, said conduit means containing a pump means.

7. The apparatus of claim 6, wherein the supply vessel is provided with overflow conduit means which also communicates with the container means.

8. The apparatus of claim 4, wherein a permanent magnet is secured to the rotor of the pump means, said magnet cooperating with inert gas contacts which in turn communicate with a means for recording the number of revolutions completed by the pump means.

9. The apparatus of claim 8, wherein the recording means is a pulse counter.

10. The apparatus of claim 8, wherein the recording means is a pulse printer provided with recording paper.

11. The apparatus of claim 4, wherein the indicating instrument, in cooperation with its limit-value contacts, communicates with a pulse generator which, in turn, controls the pump means corresponding to the position of the indicating instrument.

12. The apparatus of claim 11, wherein the detector means is connected through reversing switch means to at least two of said indicating instruments.

13. The apparatus of claim 12, wherein a control means is associated with the pulse generator, the indicating instruments and the recording means for controlling a programmed filling and emptying of the titration vessel, the addition of a diluent, the addition of a titrating agent, the monitoring of titration and the indication of the end of titration.

14. The apparatus of claim 13, wherein at least two titration phases can be separately carried out by utilizing at least two detector means with associated indicating instruments, at least two pump means with associated indicator means and at least three reversing switches associated with the control unit.

15. A process for measuring the concentration of at least one chemical compound in a solution which comprises transferring a fixed batch quantity of the solution to be analyzed to a titration vessel, simultaneously transferring a known quantity of an inert liquid diluent to said titration vessel with said solution, introducing calibrated portions of at least one titrating agent into the resultant solution in said titration vessel at a fixed rate until reaching a predetermined range preceding at least one end point, then introducing calibrated portions of said at least one titrating agent at a slower rate upon approaching said at least one end point and terminating the introduction of said calibrated portions of said at least one titrating agent upon reaching said at least one end point, and determining the amount of the titrating agent introduced by measuring the number of calibrated portions of the titrating agent delivered to the titration vessel.

16. An apparatus for measuring the concentration of at least one chemical compound in a solution which comprises a titration vessel, supply means for introducing a fixed batch quantity of said solution to said titration vessel, said supply means including injector means for introducing an inert liquid diluent to said titration vessel together with said solution and means for controlling the amount of said inert liquid diluent introduced by said injector means into said titration vessel, at least one pump means with a specific pump volume per revolution for introducing calibrated portions of a titrating agent to said titration vessel, at least one detector means for detecting the progress of the titration reaction and determining the occurrence of at least one end point which extends into said titration vessel, at least one indicating instrument operatively associated with said at least one detector means for controlling the pump means to introduce said calibrated portions of said titrating agent at a fixed rate until reaching a predetermined range preceding said at least one end point, then to introduce said calibrated portions of said titrating agent at a slower rate upon approaching said at least one end point and to terminate the operation of said pump means upon reaching said at least one end point, and indicator means associated with said pump means for counting the number of revolutions required for delivering the calibrated portions of said titrating agent needed to reach said at least one end point.

17. The apparatus of claim 11, wherein said indicating instrument includes limit-valve contacts and communicates with a pulse generator which, in turn, controls said pump means.

References Cited

UNITED STATES PATENTS

| | | | |
|---|---|---|---|
| 2,977,199 | 3/1961 | Quittner | 23—230 A |
| 3,230,767 | 1/1966 | Heigl et al. | 73—229 X |
| 3,224,271 | 12/1965 | Ichihraa | 73—229 |
| 3,419,358 | 12/1968 | Smythe et al. | 23—253 X |
| 3,195,982 | 7/1965 | Nicholson | 23—253 X |
| 3,421,855 | 1/1969 | Kateman et al. | 23—253 X |
| 3,462,244 | 8/1969 | Leisey | 23—253 X |
| 2,621,671 | 12/1952 | Eckfeldt | 23—253 A UX |
| 3,246,952 | 4/1966 | Dawe | 23—253 |
| 3,607,549 | 9/1971 | Bielefeld, Jr. et al. | 23—230 A X |

JOSEPH SCOVRONEK, Primary Examiner

U.S. Cl. X.R.

23—230 A, 253 R, 253 A